(12) United States Patent
Sakakibara et al.

(10) Patent No.: US 7,633,745 B2
(45) Date of Patent: Dec. 15, 2009

(54) ELECTRONIC DEVICE

(75) Inventors: Kenji Sakakibara, Tokyo (JP); Naka Shibata, Saitama (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 11/223,964

(22) Filed: Sep. 13, 2005

(65) Prior Publication Data
US 2006/0104013 A1    May 18, 2006

(30) Foreign Application Priority Data
Oct. 21, 2004  (JP) ............................. 2004-306274

(51) Int. Cl.
H05K 5/00 (2006.01)
H05K 7/00 (2006.01)
G06F 1/16 (2006.01)
A47B 81/00 (2006.01)

(52) U.S. Cl. ............................ 361/679.11; 361/679.08; 361/679.55; 361/679.56; 312/223.2

(58) Field of Classification Search ................. 361/679, 361/679.08, 679.11, 679.55, 679.56; 312/223.2
See application file for complete search history.

(56) References Cited

U.S. PATENT DOCUMENTS

| | | | | |
|---|---|---|---|---|
| 5,213,401 A * | 5/1993 | Hatcher | .................... | 312/208.1 |
| 5,629,832 A * | 5/1997 | Sellers | ........................ | 361/680 |
| 5,673,169 A * | 9/1997 | Wicks | ........................ | 361/680 |
| 5,898,774 A * | 4/1999 | Shindo | .................. | 379/433.13 |
| 6,025,986 A * | 2/2000 | Sternglass et al. | ....... | 361/679.08 |
| 6,121,958 A * | 9/2000 | Clark et al. | .................. | 345/168 |
| 6,144,554 A * | 11/2000 | Mok | ........................... | 361/687 |
| 6,351,372 B1 * | 2/2002 | Kim | ............................. | 361/683 |
| 6,480,372 B1 * | 11/2002 | Vong et al. | ................... | 361/680 |
| 6,483,445 B1 * | 11/2002 | England | ....................... | 341/22 |
| 6,507,483 B2 * | 1/2003 | Oura et al. | ............. | 361/679.08 |
| 6,556,430 B2 * | 4/2003 | Kuo et al. | ................... | 361/680 |
| 6,665,173 B2 * | 12/2003 | Brandenberg et al. | ........ | 361/680 |
| 6,700,773 B1 * | 3/2004 | Adriaansen et al. | ....... | 361/679.08 |
| 6,768,635 B2 * | 7/2004 | Lai et al. | .................... | 361/680 |
| 6,972,944 B2 * | 12/2005 | Clapper | ....................... | 361/679 |
| 7,031,143 B2 * | 4/2006 | Madsen et al. | ............ | 361/679.2 |
| 2002/0137476 A1 * | 9/2002 | Shin | ............................. | 455/90 |
| 2003/0006942 A1 * | 1/2003 | Searls et al. | .................. | 345/1.1 |
| 2003/0081375 A1 * | 5/2003 | Yamamoto | .................. | 361/681 |
| 2003/0197745 A1 * | 10/2003 | Daly | ........................... | 345/905 |

(Continued)

FOREIGN PATENT DOCUMENTS

JP     2001-142608      5/2001

*Primary Examiner*—Jayprakash N Gandhi
*Assistant Examiner*—Bradley H Thomas
(74) *Attorney, Agent, or Firm*—Oblon, Spivak, McClelland, Maier & Neustadt, L.L.P.

(57) ABSTRACT

An electronic device includes a movable unit having a top surface; a main body in which the movable unit is stowed and from which the movable unit is deployed by sliding the movable unit, the main body having a first surface opposed to the top surface when the movable unit is in a stowed state and in a deployed state; and a changing mechanism which changes a distance between the top surface and the first surface during a sliding operation of the movable unit so that the top surface and the first surface during the sliding operation are separated from each other by a distance greater than a distance between the top surface and the first surface in the stowed state and the deployed state of the movable unit.

10 Claims, 19 Drawing Sheets

U.S. PATENT DOCUMENTS

| | | | |
|---|---|---|---|
| 2003/0206394 A1* | 11/2003 | Ossia | 361/680 |
| 2004/0062000 A1* | 4/2004 | Duarte | 361/683 |
| 2004/0114315 A1* | 6/2004 | Anlauff | 361/681 |
| 2004/0174666 A1* | 9/2004 | Brandenberg et al. | 361/680 |
| 2004/0229662 A1* | 11/2004 | Chadha | 455/575.1 |
| 2005/0052831 A1* | 3/2005 | Chen | 361/680 |
| 2005/0104856 A1* | 5/2005 | Jacobs et al. | 345/169 |
| 2005/0104857 A1* | 5/2005 | Jacobs et al. | 345/169 |
| 2005/0122669 A1* | 6/2005 | Lee | 361/679 |
| 2005/0125570 A1* | 6/2005 | Olodort et al. | 710/15 |
| 2006/0056141 A1* | 3/2006 | Pihlaja et al. | 361/683 |
| 2006/0061943 A1* | 3/2006 | Santos et al. | 361/679 |
| 2008/0117572 A1* | 5/2008 | Maatta | 361/680 |

* cited by examiner

ELECTRONIC DEVICE

CROSS REFERENCES TO RELATED APPLICATIONS

The present invention contains subject matter related to Japanese Patent Application JP 2004-306274 filed in the Japanese Patent Office on Oct. 21, 2004, the entire contents of which are incorporated herein by reference.

BACKGROUND OF THE INVENTION

1. Field of the Invention

The present invention relates to an electronic device that includes a main body and a movable unit, and that allows the movable unit to be stowed in the main body and deployed from the main body.

2. Description of the Related Art

In related art, electronic devices, such as mobile computers, including two separate elements, namely, a main body and a movable unit, are known. In such electronic devices, a shifting mechanism of the movable unit is achieved by providing grooves on two opposite inner side surfaces of the main body and protrusions extending outward from the top surface of the movable unit. The protrusions are engaged to the grooves so that the grooves guide the protrusions horizontally in a linear fashion. On the other hand, Japanese Unexamined Patent Application Publication No. 2003-169120 (Paragraph [0009], FIG. 1 etc.), for example, discloses a mobile phone which includes a main body having a key-operating portion, and a sliding unit provided with a liquid-crystal display portion. The main body and the sliding unit are provided with a sliding mechanism via which the sliding unit can be slid linearly when, for example, the liquid-crystal display portion is to be browsed. According to this structure, the key-operating portion and the liquid-crystal display portion can have large dimensions without increasing the dimension of the main body.

SUMMARY OF THE INVENTION

However, according to these structures mentioned above, in view of the fact that the device receives an operating load in a direction perpendicular to the moving direction of the movable unit or the sliding unit, a sufficient clearance is necessary in order to reduce the friction or interference between the main body and the movable unit or the sliding unit. For this reason, the structures mentioned above are problematic in that the overall thickness of the device is large. Moreover, constantly maintaining the clearance could lead to intrusion of, for example, foreign particles into the device through the clearance and thus induce malfunction of the device.

Accordingly, it is desirable to provide a dust-proof, high-durability electronic device with a reduced overall thickness.

According to an embodiment of the present invention, there is provided an electronic device which includes a movable unit having a top surface; a main body in which the movable unit is stowed and from which the movable unit is deployed by sliding the movable unit, the main body having a first surface opposed to the top surface when the movable unit is in a stowed state and in a deployed state; and a changing mechanism which changes a distance between the top surface and the first surface during a sliding operation of the movable unit so that the top surface and the first surface during the sliding operation are separated from each other by a distance greater than a distance between the top surface and the first surface in the stowed state and the deployed state of the movable unit.

The electronic device may be, for example, a PC (personal computer), a PDA (personal digital assistant), an electronic dictionary device, a mobile phone, or other electrical appliances. The movable unit may be, for example, a keyboard, an operating portion such as a touchscreen, or a display portion. The distance between the top surface and the first surface in the stowed state and the deployed state of the movable unit may be about 0 mm to 1 mm, and moreover, is preferably 0 mm. The distance between the top surface and the first surface during the sliding operation of the movable unit may be about 1.5 mm to 3 mm. However, the two distances are not limited to these values.

Accordingly, since the distance between the movable unit and the main body is increased during the sliding operation of the movable unit, the clearance between the movable unit and the main body can be reduced to the smallest possible dimension when the movable unit is in the stowed state and the deployed state. Consequently, this achieves reduced overall thickness of the electronic device as well as preventing malfunction of the electronic device caused by intrusion of, for example, foreign particles and dust.

Furthermore, in the electronic device, the top surface and the first surface may be in contact with each other when the movable unit is in the stowed state and in the deployed state. Accordingly, the distance between the movable unit and the main body is zero when the movable unit is in the stowed state and in the deployed state, whereby foreign particles and dust are prevented from entering the electronic device. Moreover, this implies that the final stopping positions of a stowing motion and a deploying motion (i.e. the sliding motion) of the movable unit are determined by surface contact between the top surface and the first surface, and that the movable unit is supported in a planar fashion. Consequently, in comparison with an example in which a movable unit is supported by guiding grooves after being slid via protrusions and the guiding grooves, the electronic device according to the embodiment of the present invention is capable of withstanding excessive operating load.

Furthermore, in the electronic device, the movable unit may include a side surface. The main body may include a second surface facing the side surface. The changing mechanism may include a first protrusion provided on the side surface of the movable unit, and a first guiding groove provided in the second surface and engaged with the first protrusion so as to guide the first protrusion, the first guiding groove being sloped in an up-down direction in at least first and second end portions thereof.

The first guiding groove may have, for example, its first end portion sloped in the downward direction and its second end portion sloped in the upward direction, and may have its intermediate portion between the first and second end portions extending in the horizontal direction. Alternatively, the first guiding groove may have any shape that allows the top surface and the first surface to be separated by a first distance when the movable unit is in the stowed state and in the deployed state, allows the distance between the top surface and the first surface to be increased to a second distance during the sliding motion, and allows the distance between the top surface and the first surface to return to the first distance at the end of the sliding motion (i.e. when the movable unit is in the stowed state and in the deployed state). Furthermore, the first protrusion is preferably, for example, cylindrical, but may have other alternative shapes. As described above, the first guiding groove may be sloped in at least its first and second end portions, and moreover, the first guiding groove may guide the first protrusion of the movable unit. Therefore, the movable unit and the main body form a space therebetween only during the sliding motion of the movable unit. This contributes to the reduced overall thickness of the electronic device when the movable unit is in the stowed state and in the deployed state.

Furthermore, in the electronic device, the first guiding groove may be curved from the first end portion to the second end portion. Consequently, even in a case where the top surface of the movable unit and the first surface of the main body are curved, the first guiding groove can correspond to these curved surfaces, thereby contributing to the reduced overall thickness of the electronic device.

Furthermore, in the electronic device, the changing mechanism may further include a second protrusion provided on the second surface, and a second guiding groove provided in the side surface and engaged with the second protrusion so as to guide the second protrusion, the second guiding groove being sloped in the up-down direction in at least opposite end portions thereof. Consequently, in conjunction with the first protrusion and the first guiding groove, the second protrusion and the second guiding groove allow the movable unit to slide so that the movable unit can be switched between the stowed state and the deployed state. Accordingly, the movable unit is given better stability and load-withstanding properties.

Furthermore, in the electronic device, the main body may further include a first electric circuit. The movable unit may further include a second electric circuit exchanging an electrical signal with the first electric circuit. The electronic device may further include a conducting mechanism which slides in synchronization with the movable unit and electrically connects the first electric circuit and the second electric circuit on a constant basis in order to ground the first and second electric circuits. Accordingly, regardless of the positioning of the movable unit during the sliding operation, the stowed state, or the deployed state, the conducting mechanism can electrically connect the first electric circuit and the second electric circuit on a constant basis in order to ground the first and second electric circuits.

Furthermore, in the electronic device, the conducting mechanism may include a conducting member and an electrically conductive resilient member disposed between the conducting member and one of the first electric circuit and the second electric circuit, the resilient member pulling the main body and the movable unit towards each other. Since the resilient member constantly generates a pulling force that pulls the main body and the movable unit towards each other, the first protrusion is introduced into the corresponding sloped end portion of the first guiding groove when the movable unit reaches the stroke end position corresponding to the stowed state or the deployed state. Accordingly, the movable unit can be stably supported in position without requiring a designated locking mechanism at each stroke end position. Moreover, when the movable unit reaches the stroke end position corresponding to the stowed state or the deployed state, the first protrusion enters the corresponding sloped end portion such that a sense of retraction is applied to a user of the electronic device. This gives the user a good sense of haptic feedback.

According to the embodiment of the present invention, a dust-proof, high-durability electronic device with a reduced overall thickness is provided.

DESCRIPTION OF THE PREFERRED EMBODIMENTS

An embodiment according to the present invention will now be described with reference to the drawings. An electronic device according to the embodiment is directed to a PDA (personal digital assistant).

Figure 1:
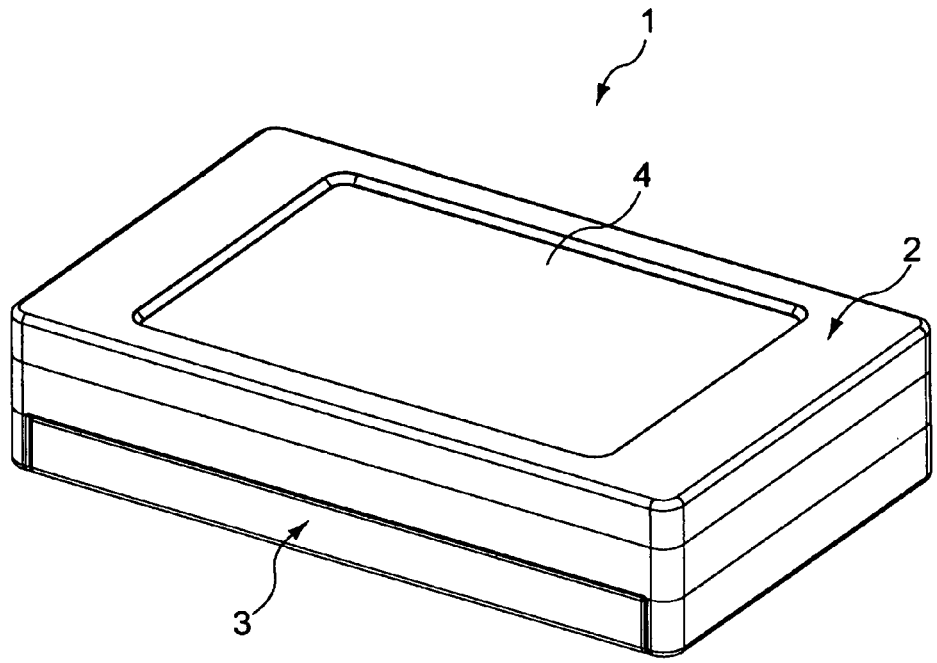
FIG. 1 is a perspective view of a PDA 1 according to an embodiment of the present invention.

FIG. 1 is a perspective view of a PDA 1 according to the embodiment. The PDA 1 includes a main body 2 and a movable unit 3. By sliding the movable unit 3, the movable unit 3 can be stowed in the main body 2 or be deployed from the main body 2. FIG. 1 illustrates a state where the movable unit 3 is stowed inside the main body 2. Although not shown in FIG. 1, the main body 2 and the movable unit 3 are formed by joining a front cabinet to a rear cabinet.

A top surface of the main body 2 is provided with a display portion 4, such as an LCD (liquid crystal display). The display portion 4 is provided with a pressure-sensitive panel through which various operations of the PDA 1 can be performed with a finger or by using a stylus pen. Therefore, the display portion 4 not only functions as a viewing portion, but also as an input portion that allows for an easy operation with a small number of inputs.

Figure 2:
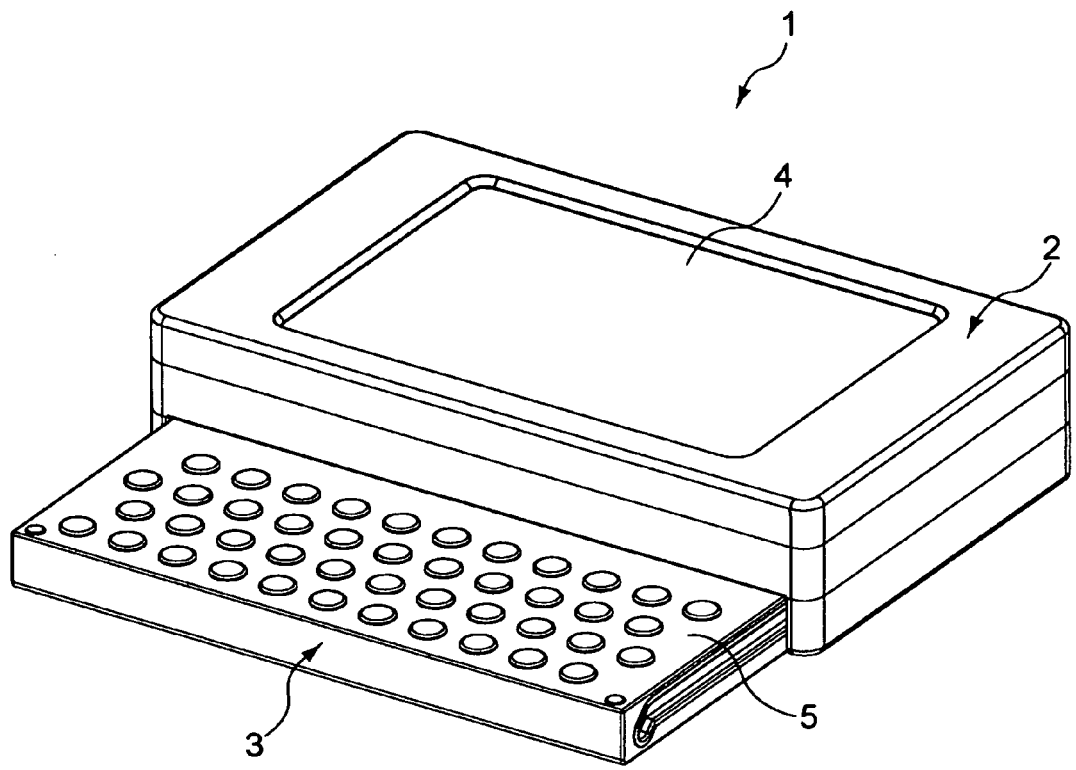
FIG. 2 is a perspective view of the PDA 1 in a state where a movable unit 3 is deployed.

FIG. 2 is a perspective view of the PDA 1 in a state where the movable unit 3 is deployed from the main body 2. As shown in FIG. 2, the top surface of the movable unit 3 in the deployed state is provided with a keyboard 5 suitable for inputting characters for writing, for example, long sentences, such that the movable unit 3 in the deployed state functions as, for example, an operating portion. Since the PDA 1 is divided into two parts, that is, the main body 2 and the movable unit 3, the PDA 1 is advantageous in that it can be made compact when it is being carried. Moreover, the sliding function of the movable unit 3 is advantageous in that the movable unit 3 can be switched between the stowed state and the deployed state single-handedly within a small amount of time.

Figure 3:
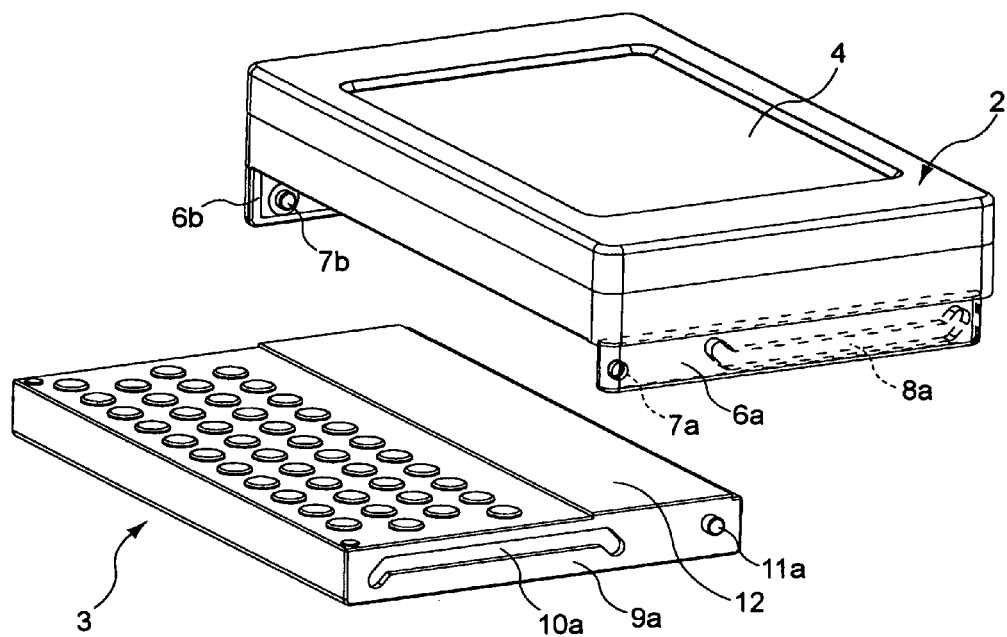
FIG. 3 is a perspective view illustrating a state where the PDA 1 is disassembled into a main body 2 and the movable unit 3.

FIG. 3 is a perspective view illustrating a state where the PDA 1 is disassembled into the main body 2 and the movable unit 3. As shown in FIG. 3, the main body 2 includes a pair of side plates 6, namely, a right side plate 6a and a left side plate 6b facing the right side plate 6a. On the other hand, the movable unit 3 includes a top surface 12 and side surfaces 9, namely, a right side surface 9a and a left side surface facing the right side surface 9a. The left side surface is not shown.

The right side surface 9a and the left side surface of the movable unit 3 are respectively provided with a protrusion 11a and a protrusion 11b. On the other hand, inner surfaces of the right side plate 6a and the left side plate 6b of the main body 2 that respectively face the right side surface 9a and the left side surface of the movable unit 3 are provided with a guiding groove 8a and a guiding groove 8b (not shown). The guiding groove 8a and the guiding groove 8b respectively guide the protrusion 11a and the protrusion 11b during a sliding motion of the movable unit 3.

Moreover, the inner surfaces of the right side plate 6a and the left side plate 6b of the main body 2 are also provided with a protrusion 7a and a protrusion 7b, respectively. On the other hand, the right side surface 9a and the left side surface of the movable unit 3 are respectively provided with guiding grooves 10a and 10b for guiding the protrusions 7a and 7b during the sliding motion of the movable unit 3.

The protrusions 7a, 7b, 11a, and 11b are, for example, cylindrical. On the other hand, each of the guiding grooves 8a, 8b, 10a, and 10b has its intermediate portion extending in the horizontal direction and its opposite end portions, for example, sloped in the up-down direction so as to move the main body 2 and the movable unit 3 away from each other. The guiding grooves 8a and 10a are symmetrical to each other in the vertical direction, and similarly, the guiding grooves 8b and 10b are symmetrical to each other in the vertical direction.

Figure 4A:
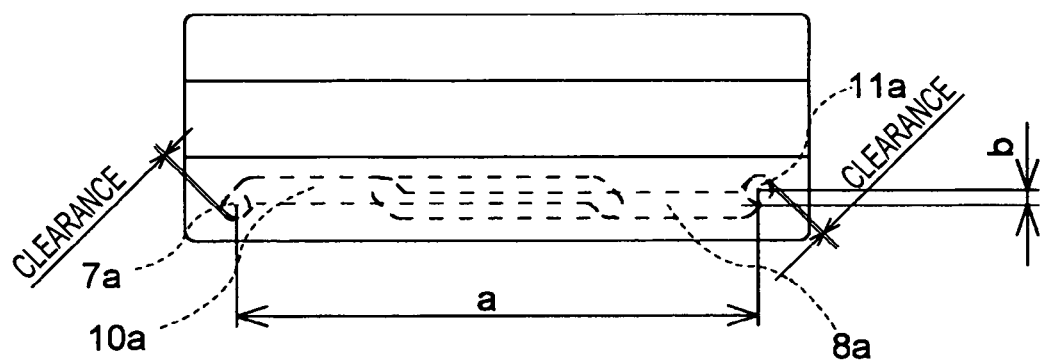
FIGS. 4A and 4B respectively illustrate a stowed state and a deployed state of the movable unit 3 as viewed from the right side of the PDA 1.
Figure 4B:
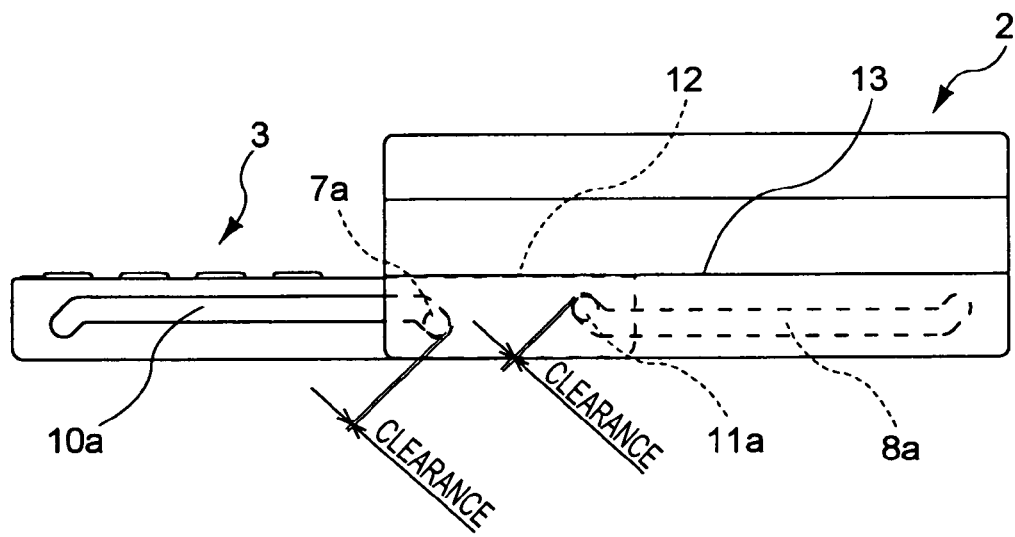

FIGS. 4A and 4B illustrate the stowed state and the deployed state of the movable unit 3 as viewed from the right side. Specifically, FIG. 4A illustrates the stowed state of the movable unit 3, whereas FIG. 4B illustrates the deployed state of the movable unit 3.

As shown in FIGS. 4A and 4B, when the guiding grooves 8a and 10a overlap each other, one end portion of the guiding groove 8a and one end portion of the guiding groove 10a are separated from each other by a distance a. The distance a is set such that the top surface 12 of the movable unit 3 and a bottom surface 13 of the main body 2 facing the top surface 12 come into contact with each other before the protrusions 11a and 7a abut on the edges of the corresponding end portions of the guiding grooves 8a and 10a when the movable unit 3 is being stowed or deployed. Thus, a small clearance is formed between each protrusion 7a, 11a and the edge of the corresponding end portion of the guiding groove 10a, 8a. Accordingly, instead of being supported by the protrusions and the edges of the opposite end portions of the guiding grooves, the main body 2 and the movable unit 3 are supported in a surface contact fashion via the top surface 12 of the movable unit 3 and the bottom surface 13 of the main body 2. Thus, the main body 2 and the movable unit 3 are capable of withstanding excessive operating load.

Furthermore, a height b of the sloped opposite end portions of the guiding grooves 8a and 10a is set in view that when the protrusions move along the intermediate horizontal portions of the guiding grooves during the sliding motion of the movable unit 3, the main body 2 and the movable unit 3 do not interfere with each other even if an operating load acts on the main body 2 and the movable unit 3 in a direction perpendicular to the sliding direction. Specifically, the height b is set in a range between, for example, 1.5 mm to 3 mm so that a space is formed between the main body 2 and the movable unit 3 during the sliding motion of the movable unit 3.

The internal mechanisms of the main body 2 and the movable unit 3 will now be described.

Figure 5:
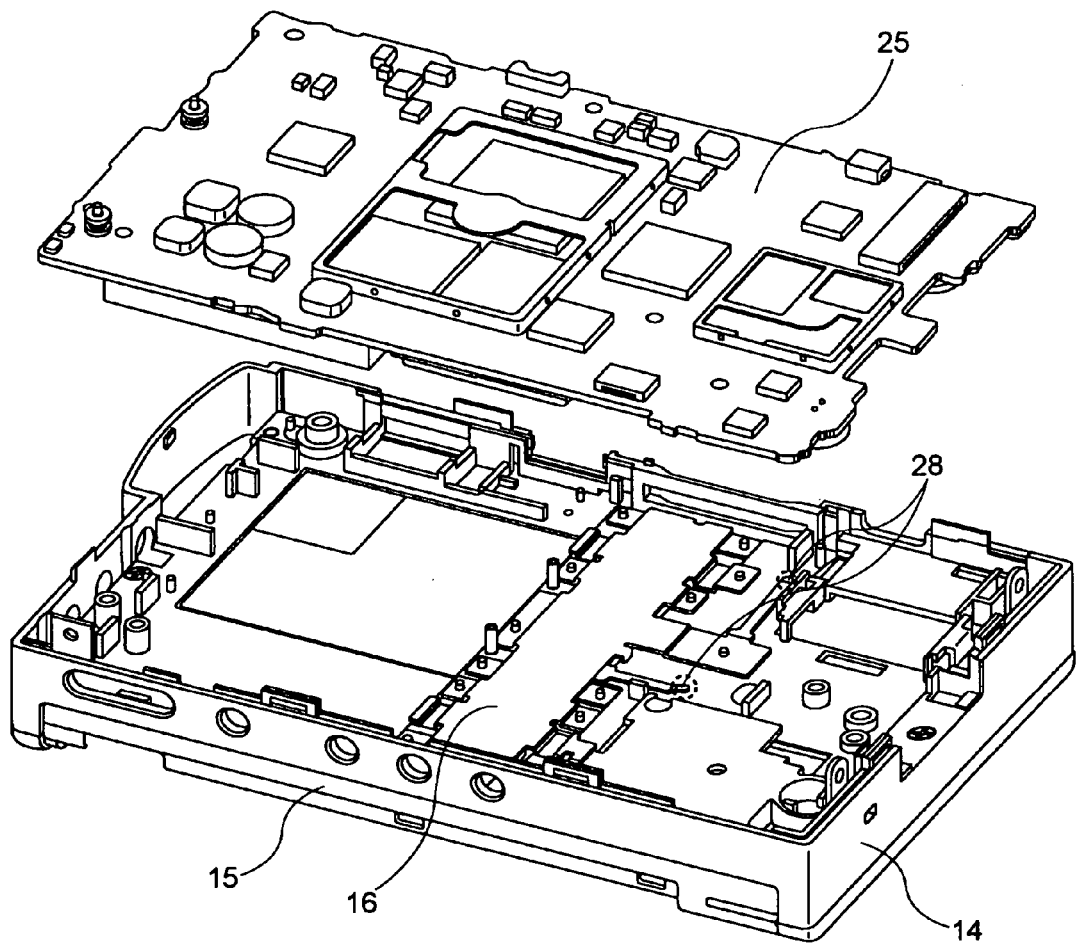
FIG. 5 is an exploded perspective view illustrating components installed in a main-body rear cabinet 14.

FIG. 5 is an exploded perspective view illustrating components installed in a main-body rear cabinet 14. As shown in FIG. 5, a metallic contact plate 16 is fixed to the main-body rear cabinet 14 by welding, and a main substrate 25 is disposed over the contact plate 16. The contact plate 16 includes cantilever segments 28 which are resiliently in contact with ground sections of the main substrate 25 on a constant basis. Thus, electrical conduction between the main body 2 and the movable unit 3 is achieved when the movable unit 3 in a stationary state and when the movable unit 3 is at each of stroke end positions of the sliding motion. Such electrical conduction allows the static electricity entering the PDA 1 from an external source to be conducted to the ground sections of the main substrate 25, whereby a grounded state is achieved.

Figure 6:
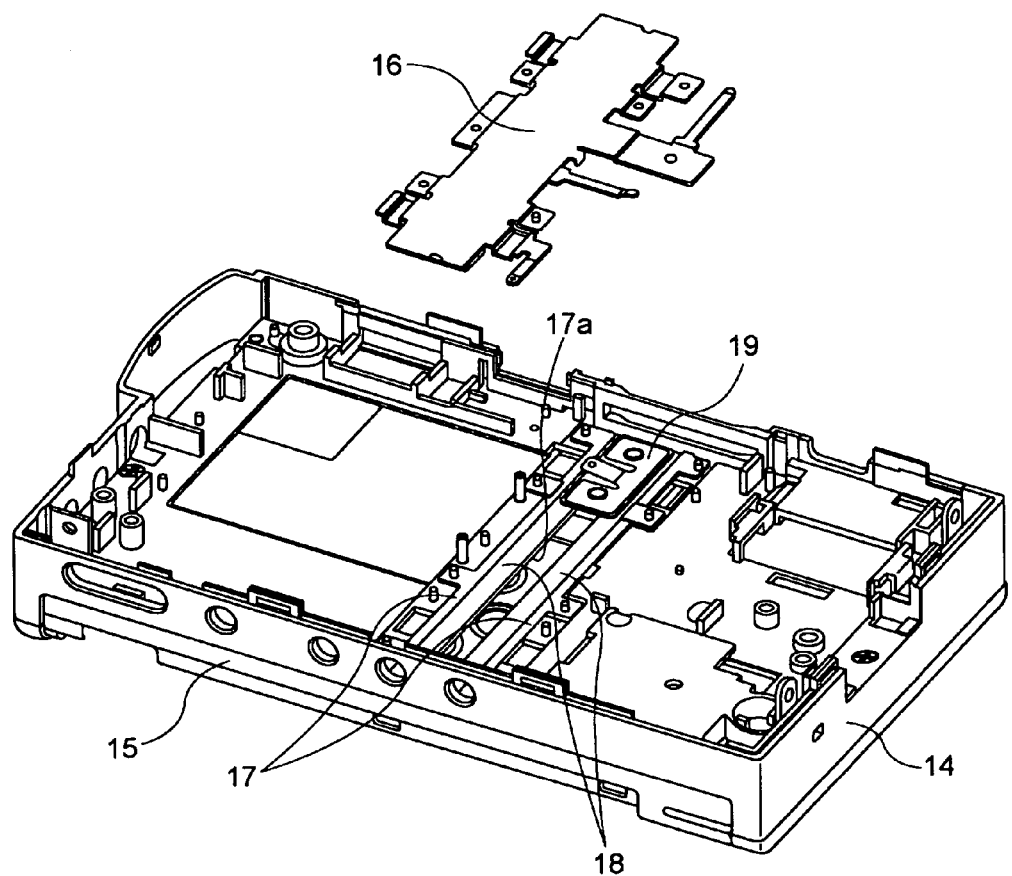
FIG. 6 is an exploded perspective view of a contact plate 16 and the main-body rear cabinet 14.

FIG. 6 is an exploded perspective view of the contact plate 16 and the main-body rear cabinet 14. As shown in FIG. 6, a metallic thrust plate 17 is disposed below the contact plate 16 and is attached to the main-body rear cabinet 14 by, for example, welding. A sliding sheet 18 formed of a self-lubricating material, such as polysilicon, is fixed on the thrust plate 17 by, for example, bonding. The thrust plate 17 is provided with a slit 17a. Moreover, a slide block assembly 19 is disposed on the thrust plate 17 in a manner such that the slide block assembly 19 is movable horizontally on the sliding sheet 18 while being guided by the slit 17a during the sliding motion of the movable unit 3. The reason that the sliding sheet 18 is formed of a self-lubricating material is to prevent the sliding sheet 18 from being baked in response to the sliding friction of the slide block assembly 19.

Figure 7:
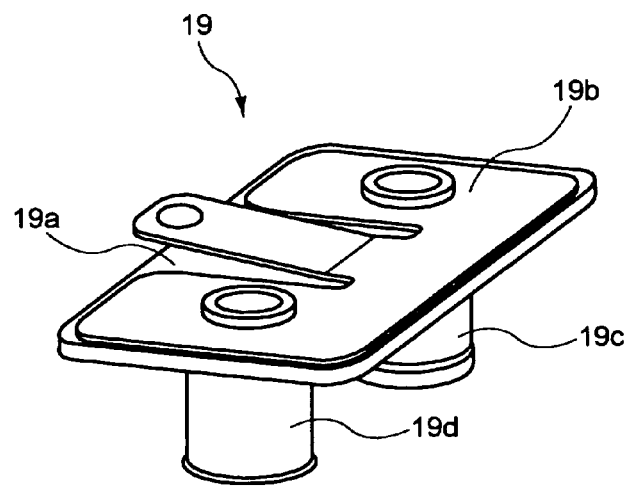
FIG. 7 is a detail view of a slide block assembly 19.

FIG. 7 is a detail view of the slide block assembly 19. As shown in FIG. 7, the slide block assembly 19 includes a metallic slide plate 19a, a metallic contact spring 19b disposed on the slide plate 19a, and two metallic shafts 19c and 19d fastened to the slide plate 19a by, for example, caulking. The reason these components are metallic is to obtain the electrically conductive state for grounding during the sliding motion of the movable unit 3. Specifically, the contact spring 19b is composed of phosphor bronze and has a cantilever structure so that the contact spring 19b is resiliently in contact with the contact plate 16 on a constant basis.

Figure 8:
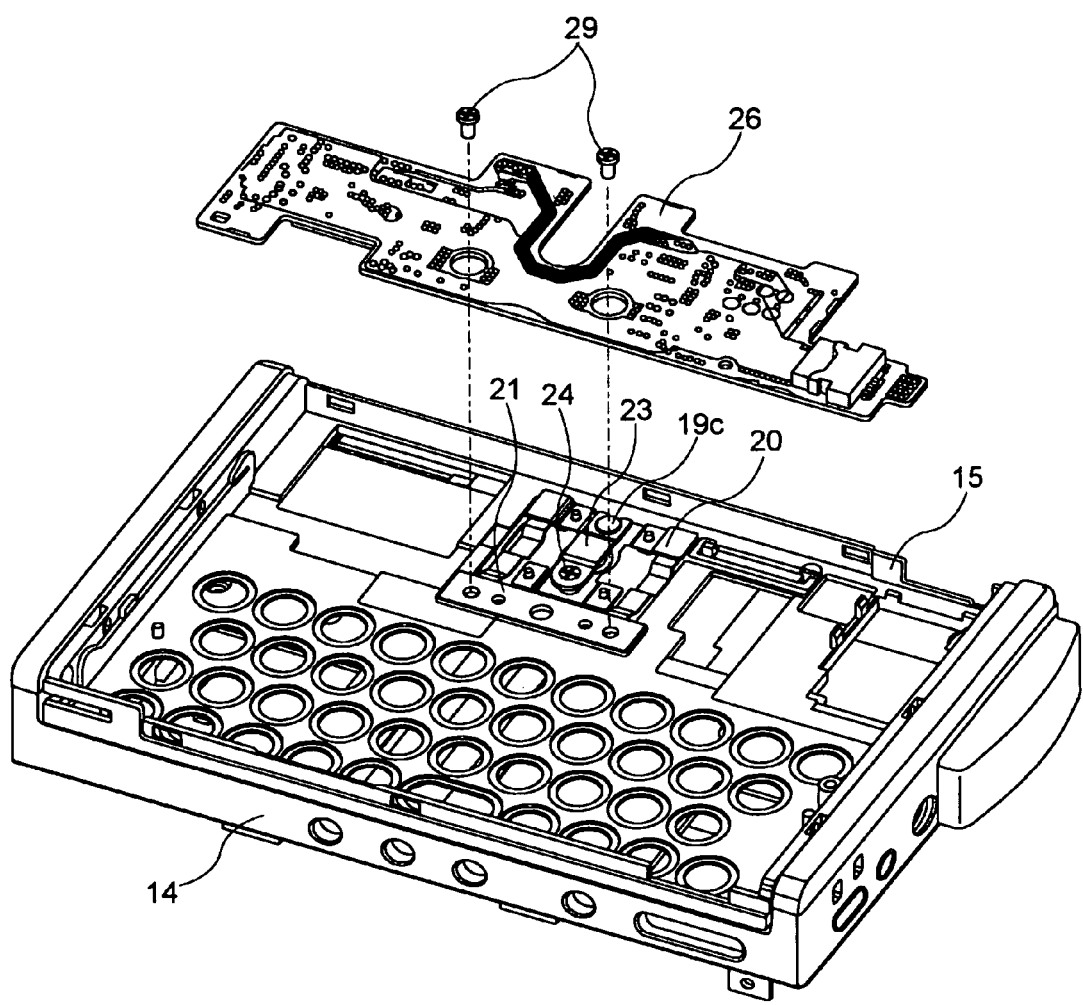
FIG. 8 is an exploded perspective view illustrating components installed in a movable-unit front cabinet 15.
Figure 9:
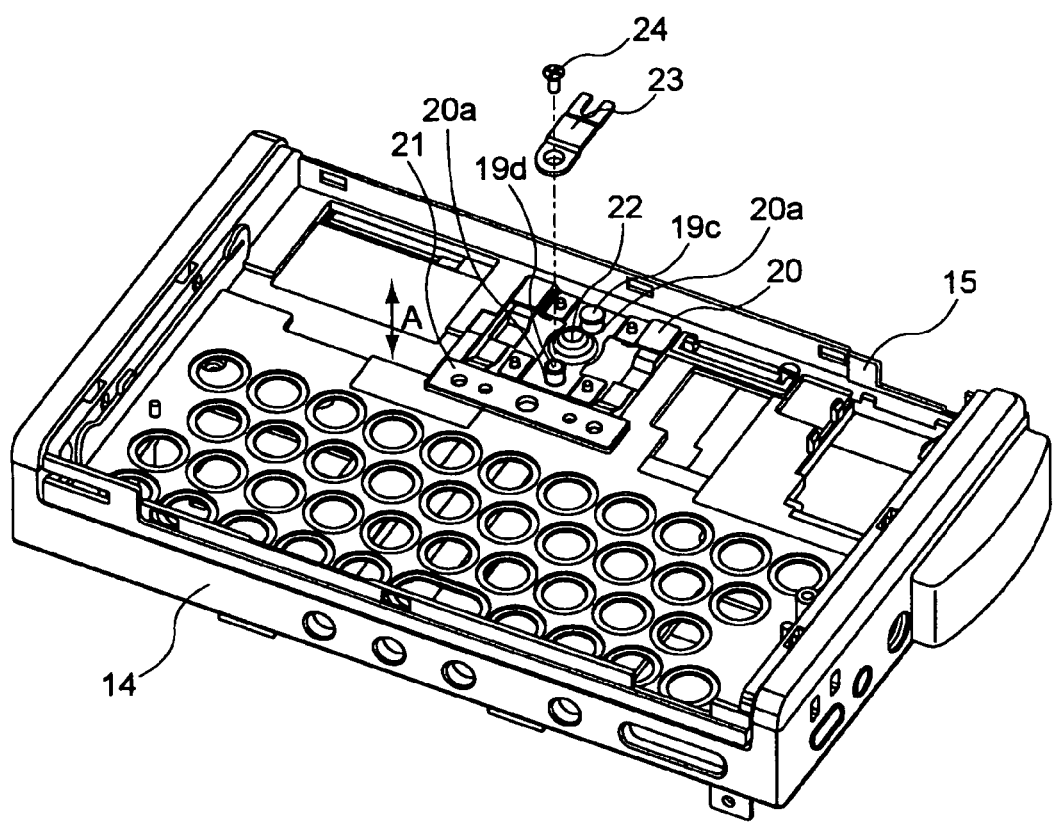
FIG. 9 is an exploded perspective view illustrating components disposed below a secondary substrate 26 shown in FIG. 8.
Figure 10:
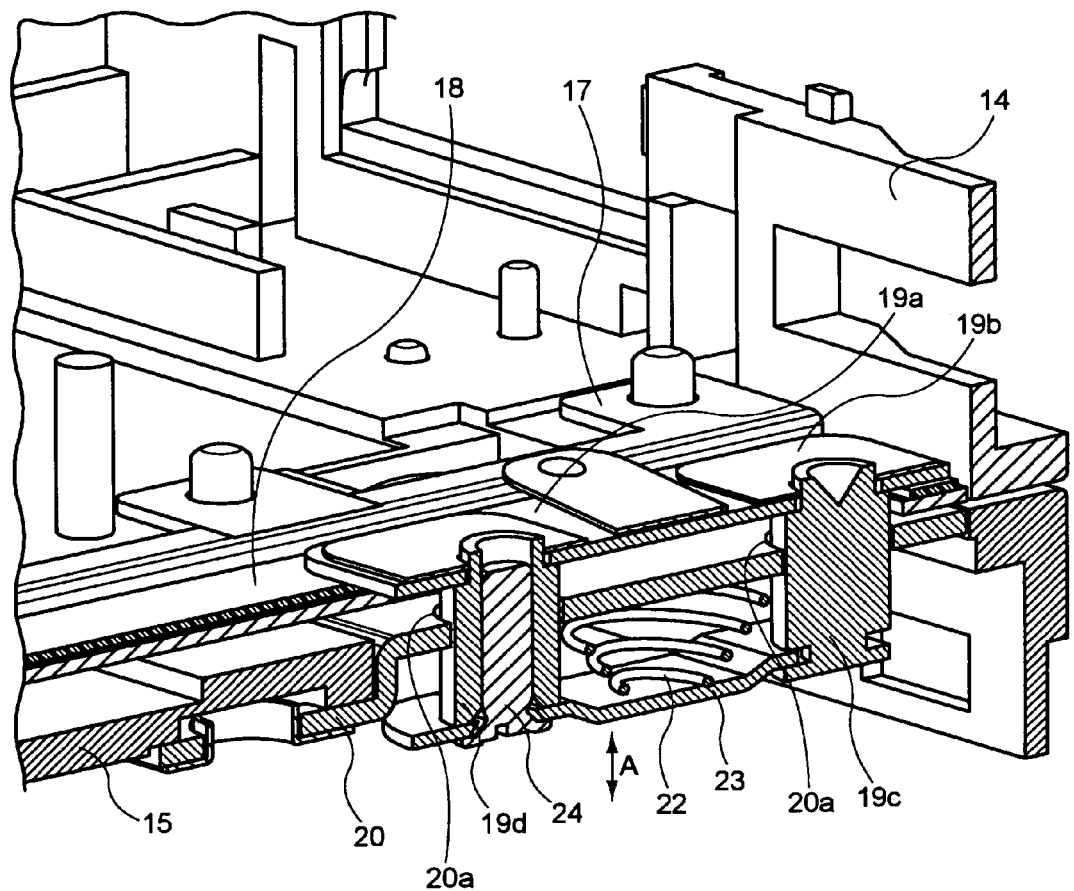
FIG. 10 is a cross-sectional view of an area in which the slide block assembly 19 is disposed.

FIG. 8 is an exploded perspective view illustrating components installed in a movable-unit front cabinet 15 as viewed from a reverse side of the PDA 1. FIG. 9 is an exploded perspective view illustrating components disposed below a secondary substrate 26 shown in FIG. 8. FIG. 10 is a cross-sectional view of an area in which the slide block assembly 19 is disposed.

The movable-unit front cabinet 15 is provided with the secondary substrate 26. The secondary substrate 26 is disposed over an H-shaped metallic pulling-spring-holding plate 20, which is attached to the movable-unit front cabinet 15 by, for example, welding. Furthermore, referring to FIGS. 8 and 9, a plate-like contact spring 21, which is formed of a metallic material such as phosphor bronze and is in contact with the pulling-spring-holding plate 20, is attached to the movable-unit front cabinet 15 by, for example, caulking. The secondary substrate 26 and the contact spring 21 are pressure-bonded to each other with secondary-substrate fastening screws 29. Accordingly, this achieves the electrical conduction between the movable unit 3 and the main body 2 for grounding.

Referring to FIGS. 9 and 10, the pulling-spring-holding plate 20 is provided with two shaft holes 20a so that the movable unit 3 is capable of moving vertically along the two shafts 19c and 19d of the slide block assembly 19 in directions indicated by a double-headed arrow A. Furthermore, referring to FIGS. 8, 9, and 10, a spring-connecting plate 23 is fastened to the shaft 19c and the shaft 19d of the slide block assembly 19 by caulking and also by using a spring fastening screw 24. Consequently, the main-body rear cabinet 14 and the movable-unit front cabinet 15 are joined to each other via the spring-connecting plate 23 and the shafts 19c and 19d extending through the slit 17a of the thrust plate 17 in the main-body rear cabinet 14 and through the two shaft holes 20a in the pulling-spring-holding plate 20.

A metallic pulling spring 22 is sandwiched between the pulling-spring-holding plate 20 and the spring-connecting plate 23 fastened to the two shafts 19c and 19d. In the stationary state shown in FIGS. 8, 9, and 10, the pulling spring 22 generates a compressive force that attracts the pulling-spring-holding plate 20 and the spring-connecting plate 23 towards each other. As described above, the slide plate 19a is disposed above the thrust plate 17 attached to the main-body rear cabinet 14, and the pulling-spring-holding plate 20 is attached to the movable-unit front cabinet 15. Accordingly, referring to FIGS. 9 and 10, due to the pulling spring 22, a force that reduces the distance between the slide plate 19a and the pulling-spring-holding plate 20 is generated. In other words, the main body 2 and the movable unit 3 are constantly pulled towards each other due to the pulling spring 22.

Since the slide plate 19a of the slide block assembly 19 slides on the sliding sheet 18 bonded on the thrust plate 17 during the sliding motion of the movable unit 3, the main body 2 and the movable unit 3 are constantly pulled towards each other regardless of the movement of the movable unit 3 or the position of the movable unit 3. As described above, the thrust plate 17 and the pulling-spring-holding plate 20 are both made of metal, and therefore, even if these plates 17 and 20 are given reduced thicknesses, they still have higher rigidity in comparison with plates composed of resin. For this reason, even though these plates 17 and 20 constantly receive a pulling force of the pulling spring 22, these metallic plates 17 and 20 are prevented from creeping in response to the force of the pulling spring 22 (see FIGS. 9 and 10).

Figure 11:
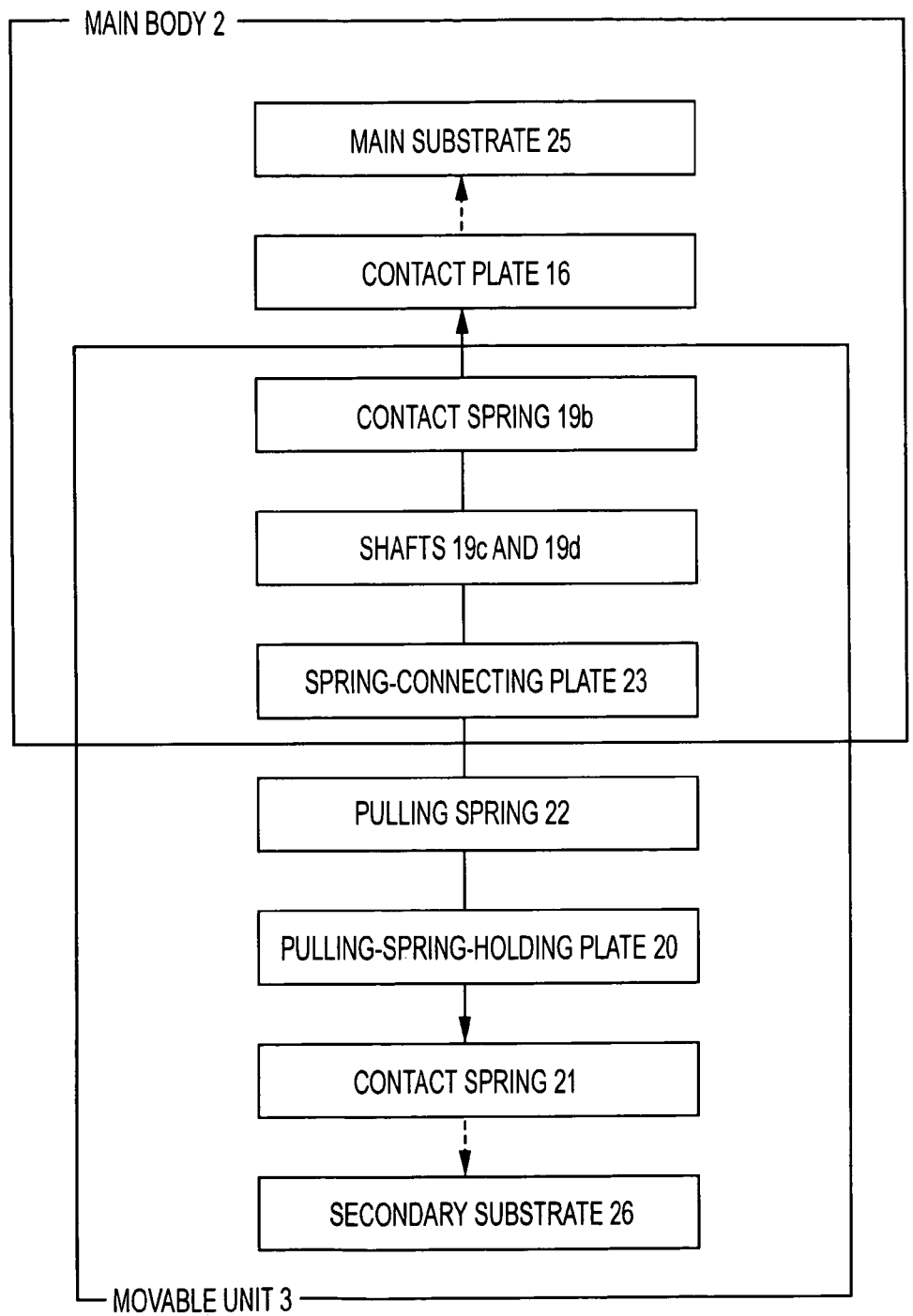
FIG. 11 illustrates a conduction path of an electrical conducting mechanism for grounding.

FIG. 11 illustrates a conduction path of an electrical conducting mechanism for grounding, which is defined by the metallic components included in the main body 2 and the movable unit 3 described above. In the metallic components between the main substrate 25 and the secondary substrate 26 shown in FIG. 11, the metallic components closer to the main body 2 are in contact with the ground sections of the main substrate 25, and the metallic components closer to the movable unit 3 are in contact with the ground sections of the secondary substrate 26. Consequently, static electricity entering the PDA 1 from an external source is conducted to the ground sections of the main substrate 25 via the metallic components so that a grounded state is achieved. This prevents, for example, electronic components disposed on each substrate 25 or 26 from being damaged due to static electricity.

According to this embodiment, in order to ensure the electrical conduction for grounding, a secondary conduction path is provided for when the movable unit 3 is at each of the stroke end positions of the sliding motion. A secondary conduction mechanism corresponding to the stroke end positions of the movable unit 3 will be described below.

Figure 12:
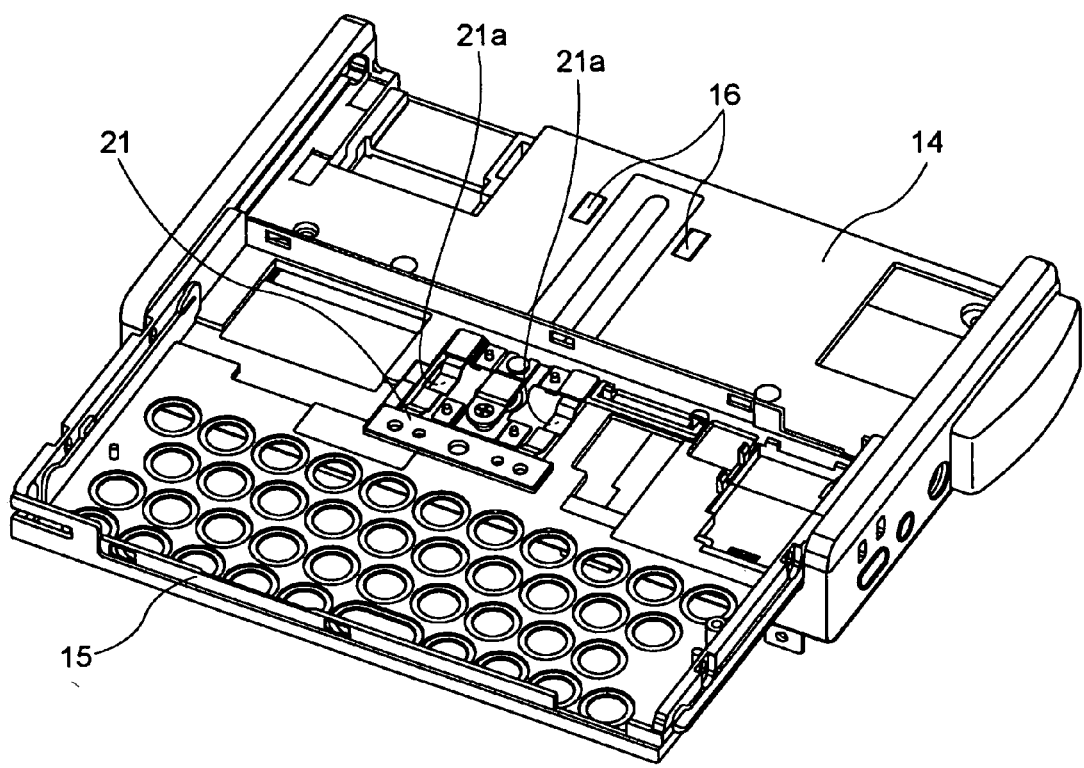
FIG. 12 is a perspective view of the main-body rear cabinet 14 and the movable-unit front cabinet 15 in a state where the movable unit 3 is deployed, as viewed from the reverse side of the movable-unit front cabinet 15.
Figure 13:
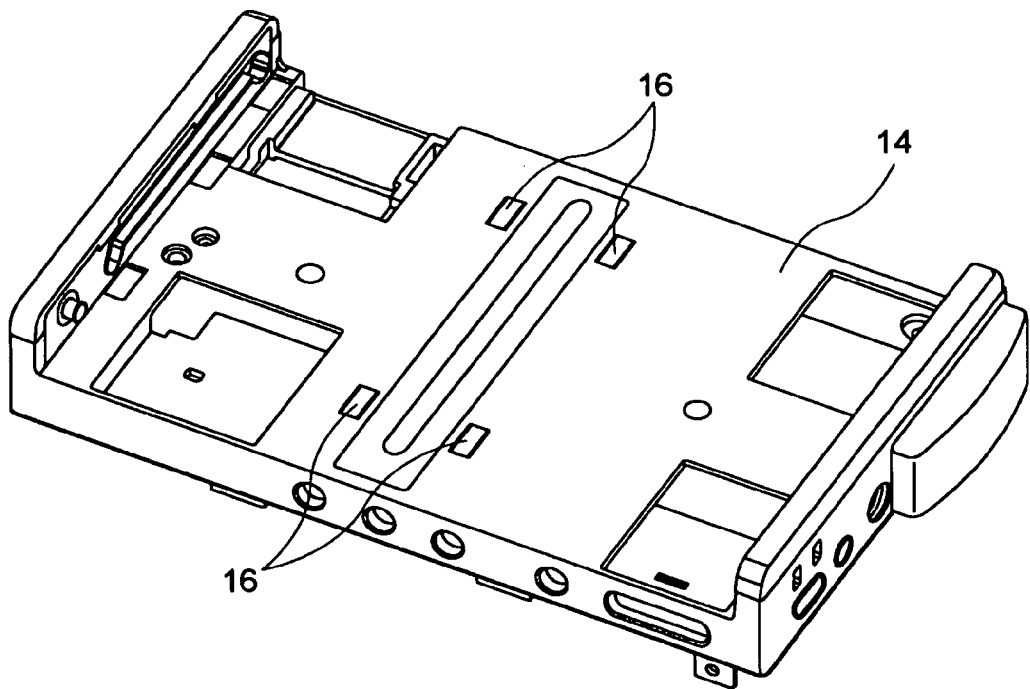
FIG. 13 is a perspective view illustrating only the main-body rear cabinet 14, as viewed from its reverse side.

FIG. 12 is a perspective view of the main-body rear cabinet 14 and the movable-unit front cabinet 15 in a state where the movable unit 3 is deployed, as viewed from the reverse side of the movable-unit front cabinet 15. FIG. 13 is a perspective view illustrating only the main-body rear cabinet 14, as viewed from its reverse side. As shown in FIGS. 12 and 13, segments of the contact plate 16 provided in the ground sections of the main-body rear cabinet 14 are exposed at four locations on the bottom surface of the main-body rear cabinet 14. On the other hand, the contact spring 21 provided in the movable-unit front cabinet 15 is provided with two projections 21a, which are exposed at two locations on the upper surface of the movable-unit front cabinet 15.

Figure 14:
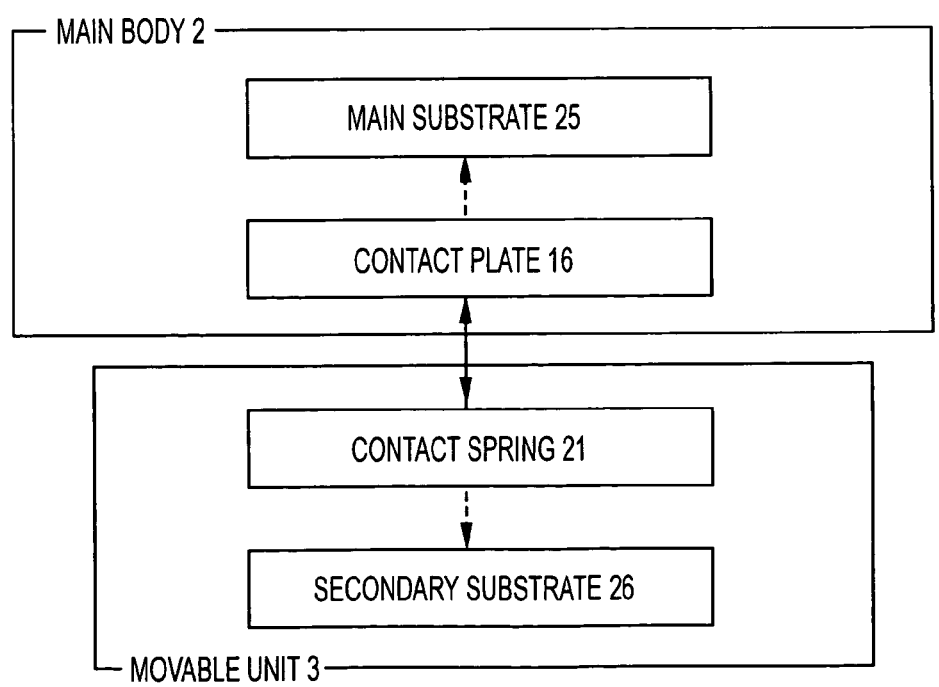
FIG. 14 illustrates a conduction path of a secondary conduction mechanism corresponding to stroke end positions of the movable unit 3.

FIG. 14 illustrates the conduction path of the secondary conduction mechanism corresponding to the stroke end positions of the movable unit 3. As shown in FIG. 14, at each of the stroke end positions of the sliding motion of the movable unit 3 (i.e. a stowing motion or a deploying motion), the contact plate 16 and the projections 21a of the contact spring 21 are directly in contact with each other at two locations, whereby the main substrate 25 of the main body 2 and the secondary substrate 26 of the movable unit 3 are electrically connected to each other. In comparison with the conduction path shown in FIG. 11, the secondary conduction path has a less number of intermediate components between the main substrate 25 and the secondary substrate 26, and therefore, the secondary conduction path achieves electrical conduction with higher reliability. This means that a grounded state can be achieved with higher reliability.

Figure 15:
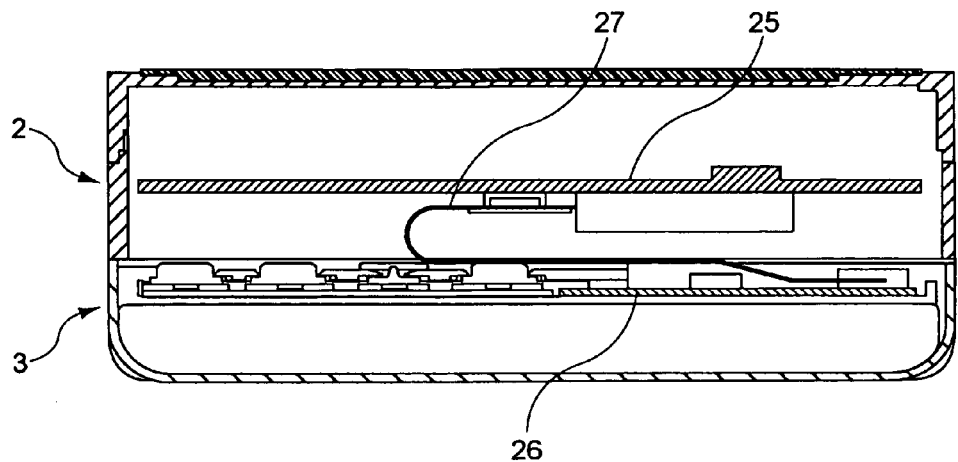
FIG. 15 is a cross-sectional view of the PDA 1 in a state where the movable unit 3 is stowed.
Figure 16:
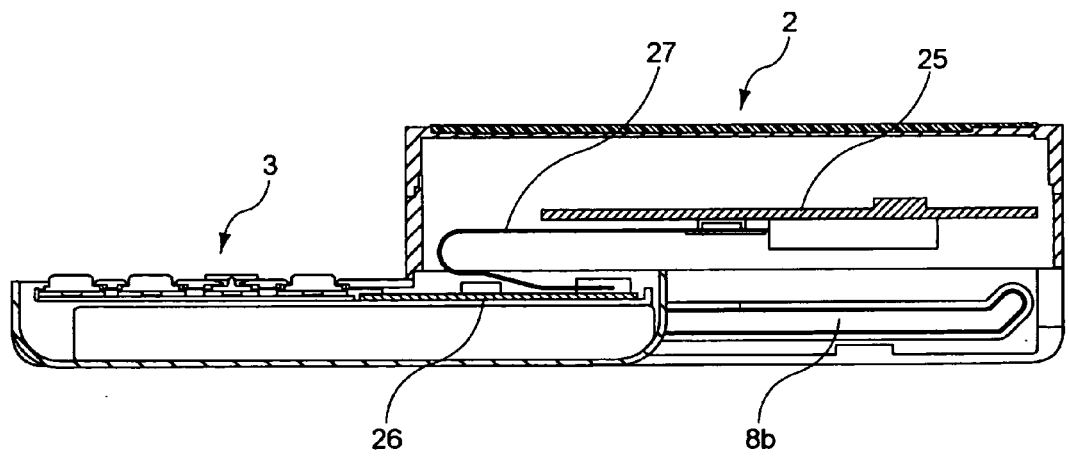
FIG. 16 is a cross-sectional view of the PDA 1 in a state where the movable unit 3 is deployed.

In this embodiment, the main substrate 25 of the main body 2 and the secondary substrate 26 of the movable unit 3 are connected to each other via a flexible substrate so that electric signals are exchanged between the two substrates 25 and 26. Thus, an electrical operation of the PDA 1 can be performed, which may include, for example, commanding the display portion 4 to display data input to the keyboard 5 of the movable unit 3 when the movable unit 3 is in the deployed state. FIG. 15 is a cross-sectional view of the PDA 1 in a state where the movable unit 3 is stowed. FIG. 16 is a cross-sectional view of the PDA 1 in a state where the movable unit 3 is deployed. In FIGS. 15 and 16, components that are not relevant to the electrical conduction are not shown.

In the stowed state of the movable unit 3 shown in FIG. 15, the main substrate 25 and the secondary substrate 26 are connected to each other via an intermediate flexible substrate 27, whereby the electrical conduction between the two substrates 25 and 26 is maintained. On the other hand, in the deployed state of the movable unit 3 shown in FIG. 16, the flexible substrate 27 is bent in response to the movement of the movable unit 3, whereby the electrical conduction between the main substrate 25 and the secondary substrate 26 is constantly maintained.

An operation of the PDA 1 having the structure described above will now be described. FIGS. 17A to 17D illustrate the sliding process of the movable unit 3 from the stowed state to the deployed state. Each of FIGS. 17A to 17D includes a front view of the PDA 1 on the left side as viewed in the sliding direction of the movable unit 3, and a right side view of the PDA 1 on the right side.

Figure 17A:
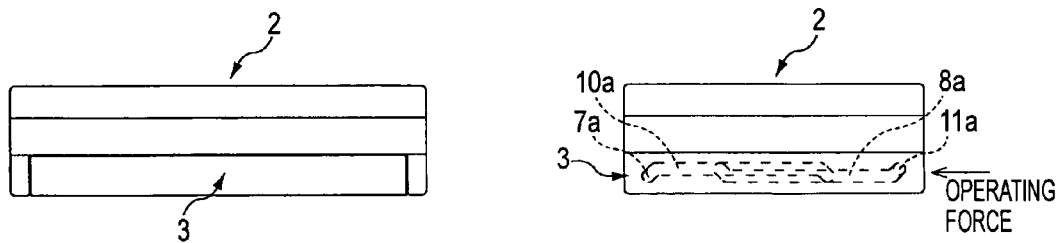
FIGS. 17A to 17D illustrate a sliding process of the movable unit 3 from the stowed state to the deployed state.
Figure 17B:
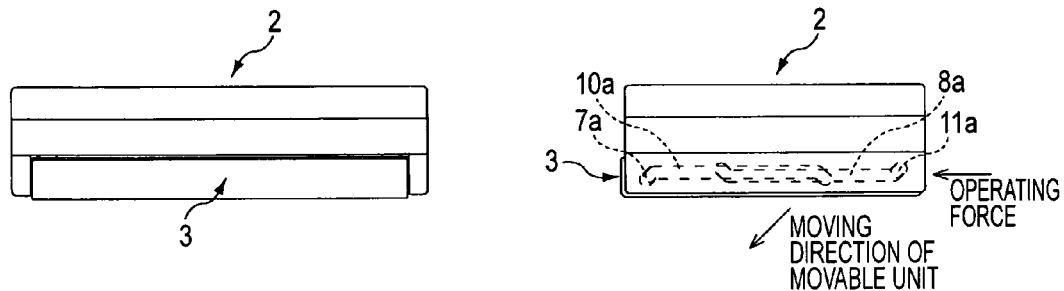

Referring to FIGS. 17A to 17D, when an operating force is applied to the movable unit 3 in the stowed state in a direction indicated by an arrow, the protrusions 11a and 11b of the movable unit 3 slide along the guiding grooves 8a and 8b of the main body 2, and the protrusions 7a and 7b of the main body 2 slide along the guiding grooves 10a and 10b of the movable unit 3. Since the opposite end portions of each guiding groove are sloped, the movable unit 3 moves downward at an angle away from the main body 2, as shown in FIG. 17B. Subsequently, referring to FIG. 17C, the movable unit 3 moves horizontally while maintaining the distance corresponding to the height b that is perpendicular to the sliding direction. Finally, referring to FIG. 17D, the movable unit 3 moves at an angle towards the main body 2 so that the top surface 12 of the movable unit 3 becomes surface contact with the bottom surface 13 of the main body 2 facing the top surface 12. As a result, the movable unit 3 is stopped. As described above, since the final stopping positions of the movable unit 3 are determined by surface contact, the main body 2 and the movable unit 3 are capable of withstanding excessive operating load.

Accordingly, the top surface 12 of the movable unit 3 is in contact with the bottom surface 13 of the main body 2 in both the stowed state and the deployed state. On the other hand, during the sliding motion of the movable unit 3, the movable unit 3 moves away from the main body 2 by the distance corresponding to the height b due to the shape of the guiding grooves 8a, 8b, 10a, and 10b. For this reason, the main body 2 and the movable unit 3 does not require a fixed clearance therebetween on a constant basis, thereby achieving a reduced overall thickness of the PDA 1 in the stationary state of the movable unit 3. Moreover, omitting such a fixed clearance may reduce the chances of, for example, intrusion of foreign particles and dust in the PDA 1, whereby the PDA 1 can be prevented from malfunctioning.

Furthermore, as described above, during the sliding motion of the movable unit 3, the slide plate 19a fastened to the movable unit 3 via the pulling spring 22 and the shafts 19c and 19d slides on the sliding sheet 18 bonded to the thrust plate 17 of the main body 2. On the other hand, the slide plate 19a is stopped at one of the ends of the slit 17a when the movable unit 3 is in the stowed state or the deployed state.

Figure 17C:
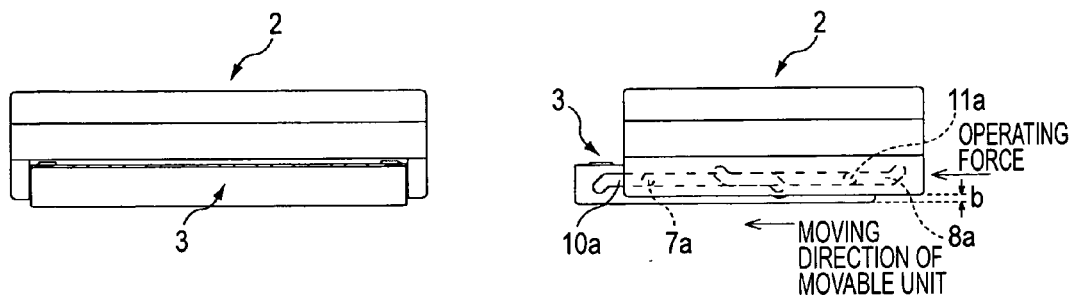
Figure 17D:
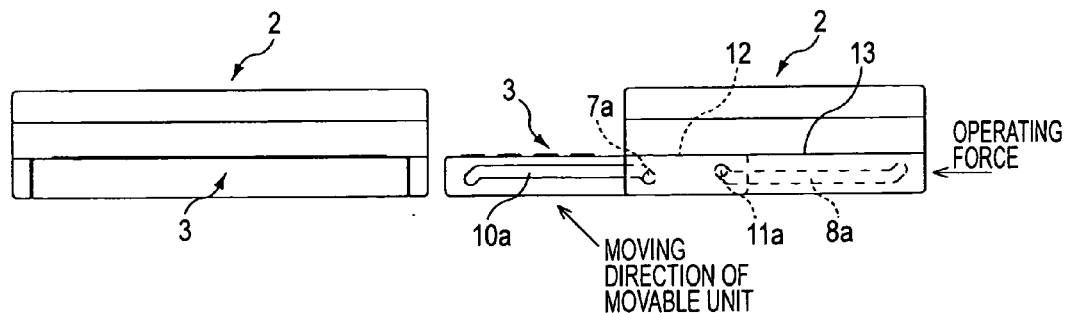
Figure 18A:
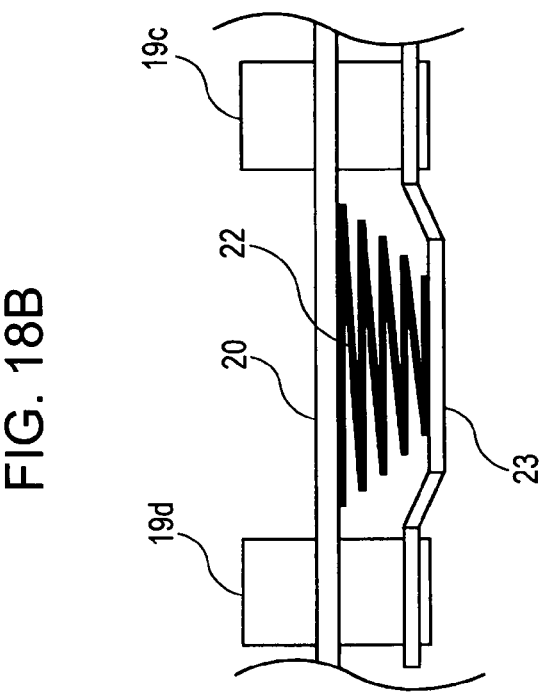
FIGS. 18A and 18B illustrate the transition of a pulling spring 22 during a sliding motion of the movable unit 3.
Figure 18B:
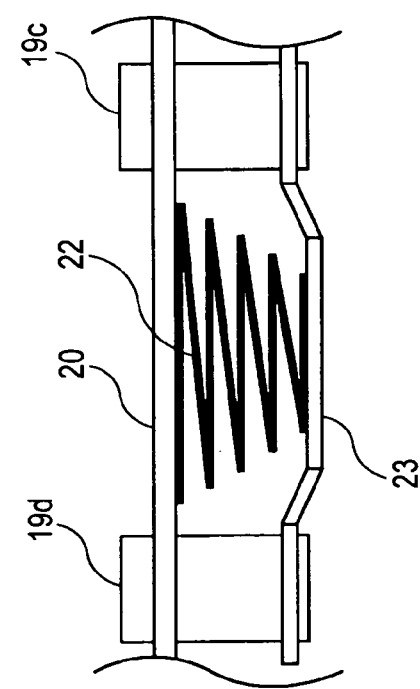

FIGS. 18A and 18B illustrate the transition of the pulling spring 22 during the sliding motion of the movable unit 3. Specifically, FIG. 18A illustrates the pulling spring 22 in the stationary state of the movable unit 3, i.e. the stowed state or the deployed state, and FIG. 18B illustrates the pulling spring 22 during the sliding motion of the movable unit 3. Referring to FIG. 18A, in the stationary state of the movable unit 3, such as the state shown in FIG. 17A or 17D, the pulling spring 22 generates a force that attracts the pulling-spring-holding plate 20 and the spring-connecting plate 23 towards each other, such that the main body 2 and the movable unit 3 are pulled towards each other. On the other hand, referring to FIG. 18B, during the sliding motion of the movable unit 3 as shown in FIGS. 17B and 17C, the movable unit 3 is guided by the guiding groove 8a so as to be shifted downward at an angle, and then moves horizontally while maintaining the distance corresponding to the height b. During this horizontal movement of the movable unit 3, the pulling-spring-holding plate 20 fastened to the movable-unit front cabinet 15 of the movable unit 3 is shifted downward, whereby the pulling spring 22 becomes compressed. In this compressed state, the pulling spring 22 still generates the force attracting the pulling-spring-holding plate 20 and the spring-connecting plate 23 towards each other, such that the main body 2 and the movable unit 3 are pulled towards each other.

Furthermore, the force pulling the main body 2 and the movable unit 3 towards each other allows the protrusions 7a and 11a to be engaged to the corresponding sloped end portions of the respective guiding grooves 10a and 8a. Accordingly, the movable unit 3 can be supported without requiring a designated locking mechanism. At the same time, the force pulling the main body 2 and the movable unit 3 towards each other also generates a sense of retraction at the stroke end positions of the stowing and deploying operations of the movable unit 3 so as to give a user a good sense of haptic feedback.

In addition to generating the pulling force, because the pulling spring 22 is electrically conductive, as described above, the pulling spring 22 also functions as a conductor between the main body 2 and movable unit 3.

According to this embodiment, the displaying direction of the display portion 4 can be switched automatically in synchronization with the sliding motion. The structure and the operation for switching the displaying direction of the display portion 4 will be described below.

Figure 19:
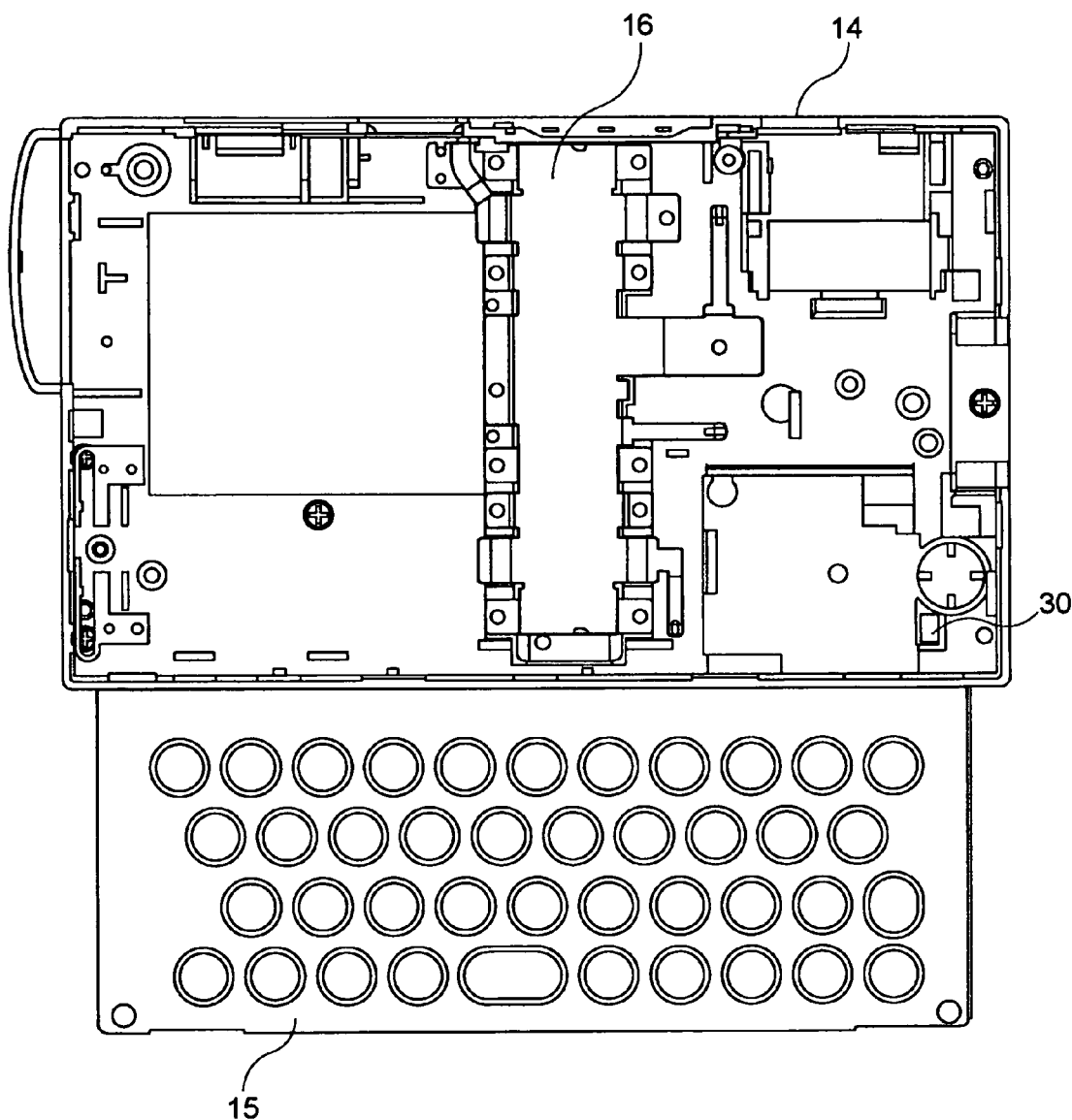
FIG. 19 is a top view of the main-body rear cabinet 14 and the movable-unit front cabinet 15 in the deployed state of the movable unit 3.

FIG. 19 is a top view of the main-body rear cabinet 14 and the movable-unit front cabinet 15 in the deployed state of the movable unit 3. As shown in FIG. 19, a magnet 30 is provided in the main-body rear cabinet 14 at a section near the right side plate 6a and the protrusion 7a.

Figure 20:
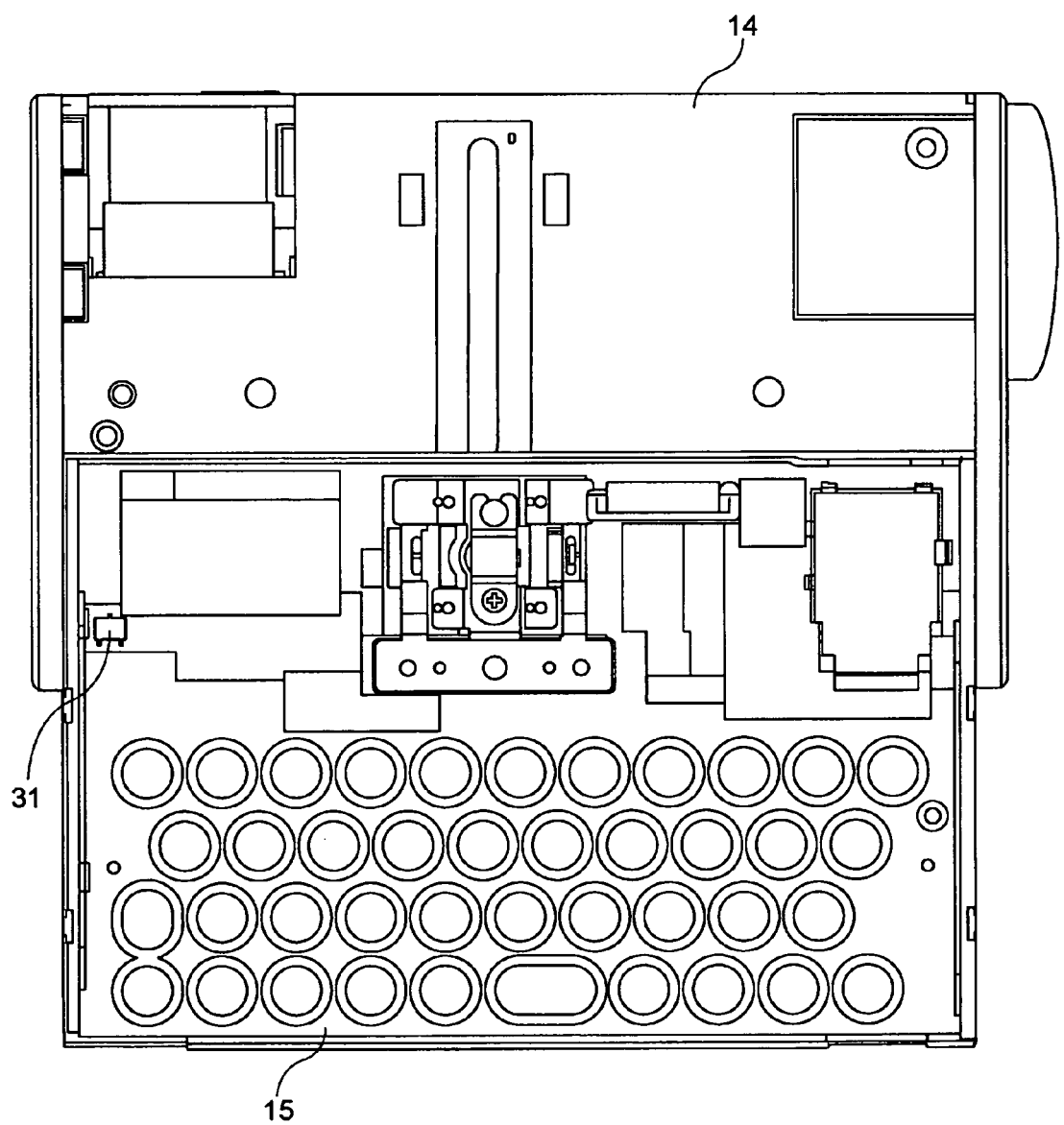
FIG. 20 is a bottom view of the main-body rear cabinet 14 and the movable-unit front cabinet 15 in the deployed state of the movable unit 3.

FIG. 20 is a bottom view of the main-body rear cabinet 14 and the movable-unit front cabinet 15 in the deployed state of the movable unit 3. As shown in FIG. 20, the movable-unit front cabinet 15 is provided with a Hall element 31. The Hall element 31 detects a change in the magnetic field when it approaches the magnet 30, and determines the position of the movable unit 3 based on the change in the magnetic field. Moreover, based on the position of the movable unit 3, the Hall element 31 commands the main substrate 25 to switch the displaying direction of the display portion 4 between lengthwise and crosswise directions.

Figure 21:
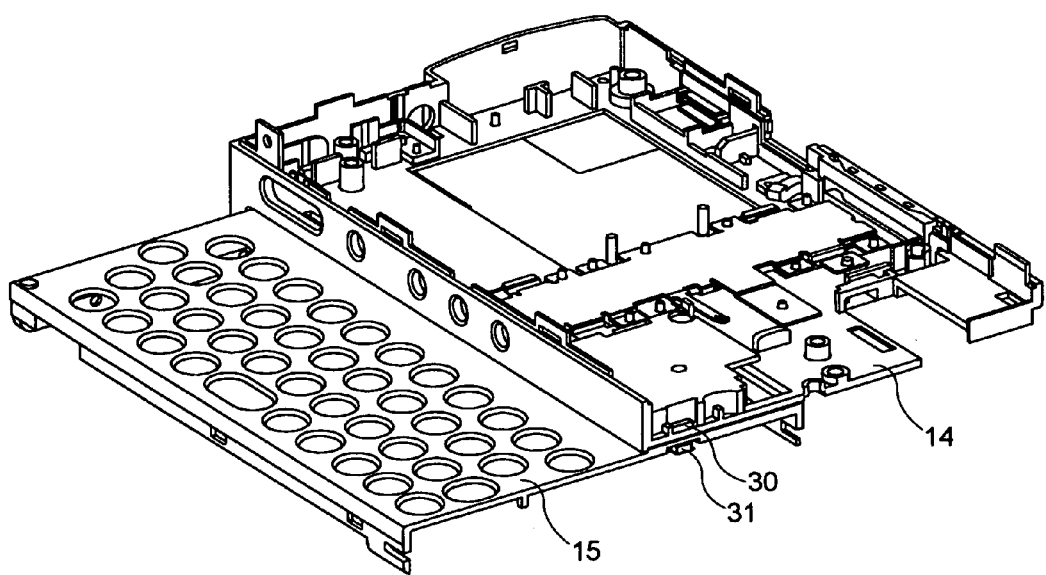
FIG. 21 is a perspective view illustrating the positional relationship between a magnet 30 and a Hall element 31.

FIG. 21 is a perspective view illustrating the positional relationship between the magnet 30 and the Hall element 31. As shown in FIG. 21, the magnet 30 is disposed directly above the Hall element 31 in the vertical direction when the movable unit 3 is in the deployed state.

Figure 22A:
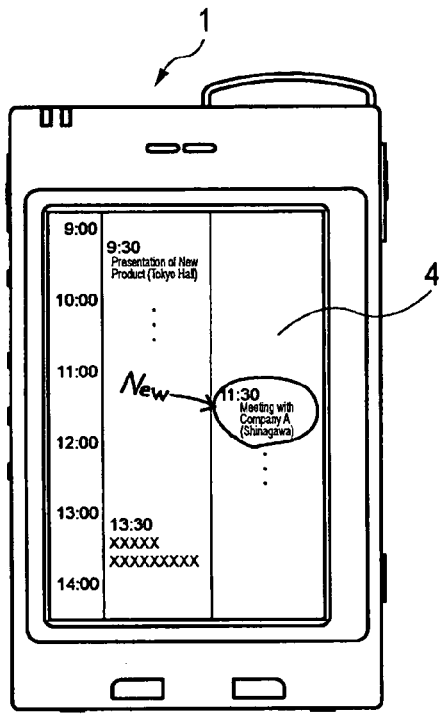
FIGS. 22A and 22B illustrate the PDA 1 in a state where the displaying direction of a display portion 4 is switched from one direction to the other.
Figure 22B:
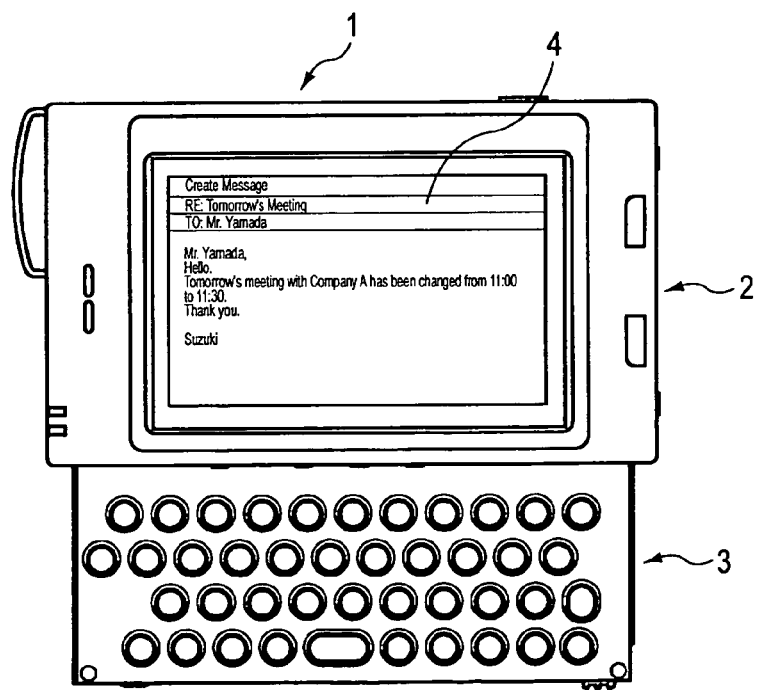

FIGS. 22A and 22B illustrate the PDA 1 in a state where the displaying direction of the display portion 4 is switched from one direction to the other. Specifically, FIG. 22A illustrates the PDA 1 when the movable unit 3 is in the stowed state, whereas FIG. 22B illustrates the PDA 1 when the movable unit 3 is in the deployed state. Referring to FIG. 22A, since the Hall element 31 and the magnet 30 are distant from each other when the movable unit 3 is in the stowed state, the Hall element 31 detects that the movable unit 3 is at the stowed position and commands the display portion 4 to display a screen in the lengthwise direction of the PDA 1. In this case, the display portion 4 allows for a relatively simple input operation using, for example, a finger or a stylus pen. On the other hand, since the Hall element 31 and the magnet 30 are disposed close to each other in the vertical direction when the movable unit 3 is in the deployed state as shown in FIG. 21, the Hall element 31 detects that the movable unit 3 is at the deployed position and commands the display portion 4 to display the screen in the crosswise direction of the PDA 1. In this case, the display portion 4, for example, allows for a character input operation for relatively long sentences via the keyboard 5 on the movable unit 3. According to the PDA 1 in this embodiment, the displaying direction of the display portion 4 can be switched in response to the positional detection of the movable unit 3 by the Hall element 31 without requesting the user for a switching operation, thereby contributing to better user-friendliness.

Furthermore, the PDA 1 according to this embodiment has a structure in which the stylus pen used for performing various input operations via the display portion 4 is prevented from falling out when the movable unit 3 is in the stowed state. Such a structure for storing the stylus pen will be described below in detail.

Figure 23A:
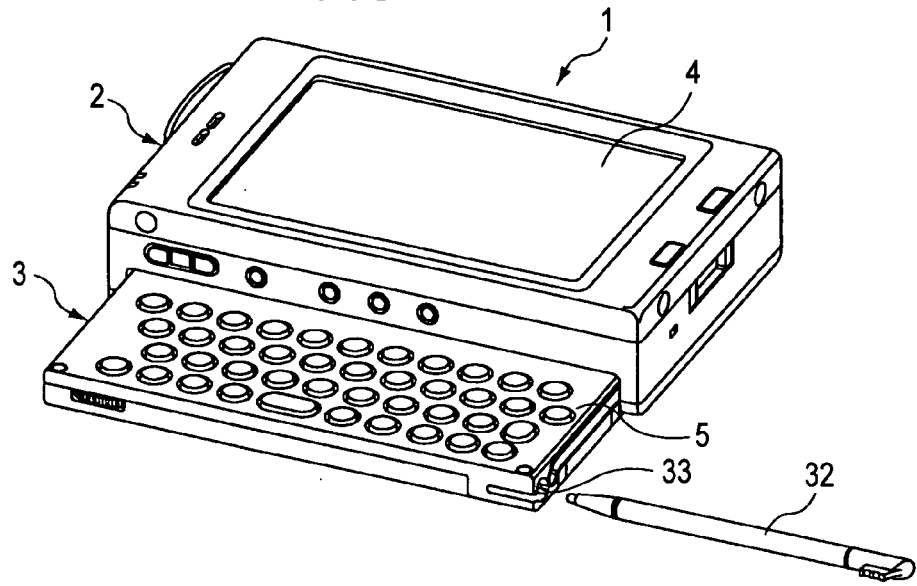
FIGS. 23A to 23C are perspective views of the PDA 1 and a stylus pen 32 when the movable unit 3 is in the deployed state and in the stowed state.
Figure 23B:
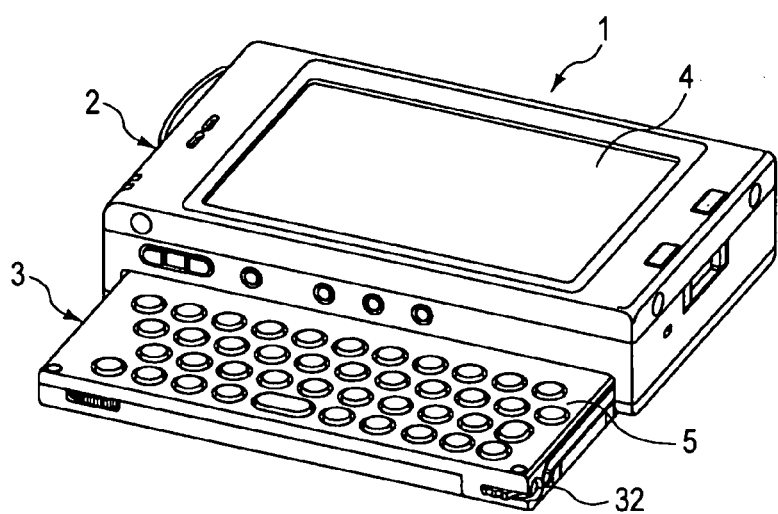
Figure 23C:
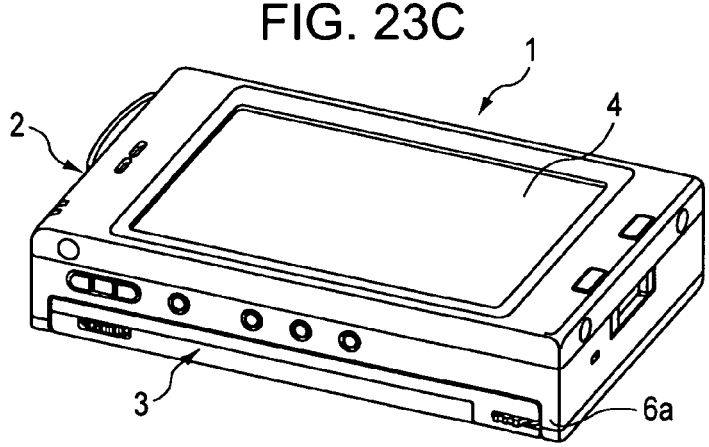

FIGS. 23A to 23C are perspective views of the PDA 1 and a stylus pen 32 when the movable unit 3 is in the deployed state and in the stowed state. Specifically, FIG. 23A illustrates a state where the stylus pen 32 is taken out from the movable unit 3 in the deployed state. In the deployed state of the movable unit 3 shown in FIG. 23A, if an input operation is to be performed via the display portion 4, the stylus pen 32 is pulled out from an insertion opening 33 extending perpendicular to the lateral side surfaces of the movable unit 3.

On the other hand, FIG. 23B illustrates a state where the stylus pen 32 is inserted in the insertion opening 33 of the movable unit 3 in the deployed state. The insertion opening 33 is designed such that the top end of the stylus pen 32 is prevented from protruding from the insertion opening 33, i.e. the right side surface 9a of the movable unit 3, when the stylus pen 32 is disposed inside insertion opening 33.

FIG. 23C illustrates a state where the stylus pen 32 is inserted in the insertion opening 33, and the movable unit 3 is stowed in the main body 2. When the movable unit 3 is in the stowed state as shown in FIG. 23C, the right side plate 6a of the main body 2 retains the stylus pen 32 so that the stylus pen 32 is prevented from accidentally falling out when the PDA 1, for example, is being carried.

The technical scope of the present invention is not limited to the above embodiment, and modifications are permissible within the scope and spirit of the present invention.

For example, although the electronic device is directed to a PDA in the above embodiment, the present invention may be applied to other types of electronic devices that include a main body and a movable unit, such as a personal computer, a mobile phone, and an electronic dictionary device.

Furthermore, although the opposite end portions of each of the guiding grooves 8a, 8b, 10a, and lob are sloped and the intermediate portion between the opposite end portions of each guiding groove is linear in the above embodiment, the guiding grooves 8a, 8b, 10a, and 10b may have other alternative shapes. For example, each guiding groove may be curved from one end portion to the other end portion. In other words, any shape is permissible as long as it allows the movable unit 3 to move away from the main body 2 during the sliding motion of the movable unit 3.

Furthermore, although the movable unit 3 functions as an operating portion having, for example, the keyboard 5 in the above embodiment, the movable unit 3 does not necessarily have to function as an operating portion and may alternatively function as, for example, a display portion. In that case, the top surface of the main body 2 may also be provided with a display portion so that a total of two display portions are provided, or the display portion on the main body 2 may be omitted.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
   a movable unit having a top surface, the top surface including a plurality of buttons configured to receive input from a user;
   a main body in which the movable unit is stowed and from which the movable unit is deployed by sliding the movable unit, the main body having a first surface opposed to the top surface when the movable unit is in a stowed state and in a deployed state; and
   a changing mechanism which changes a vertical distance between the top surface and the first surface during a sliding operation of the movable unit so that the top surface and the first surface during the sliding operation are separated from each other by a distance greater than a distance between the top surface and the first surface in the stowed state, said distance substantially perpendicular to said sliding, the changing mechanism including a first protrusion and a first guiding groove engaged with the first protrusion so as to guide the first protrusion, the first guiding groove being horizontal in a central portion and being sloped up along both first and second outermost end; and
   wherein the movable unit includes a side surface, wherein the main body includes a second surface facing the side surface, and wherein the first protrusion is provided on the side surface of the movable unit, and the first guiding groove is provided in the second surface; and
   wherein the changing mechanism further includes a second protrusion provided on the second surface, and a second guiding groove provided in the side surface and engaged with the second protrusion so as to guide the second protrusion, the second guiding groove being horizontal in a central portion and being sloped down along both first and second outermost end portions thereof.

2. The electronic device according to claim 1, wherein the top surface and the first surface are in contact with each other when the movable unit is in the stowed state and in the deployed state.

3. The electronic device according to claim 1, wherein the first guiding groove is curved from the first end portion to the second end portion.

4. The electronic device according to claim 1, wherein the main body further includes a first electric circuit, wherein the movable unit further includes a second electric circuit exchanging an electrical signal with the first electric circuit, and wherein the electronic device further comprises a conducting mechanism which slides in synchronization with the movable unit and electrically connects the first electric circuit and the second electric circuit on a constant basis in order to ground the first and second electric circuits.

5. The electronic device according to claim 4, wherein the conducting mechanism includes a conducting member and an electrically conductive resilient member disposed between the conducting member and one of the first electric circuit and the second electric circuit, the resilient member pulling the main body and the movable unit towards each other.

6. The electronic device according to claim 1 wherein the movable unit includes a second side surface, wherein the main body includes a third surface facing the second side surface, and wherein the changing mechanism includes a third protrusion provided on the second side surface of the movable unit, and a third guiding groove provided in the third surface and engaged with the third protrusion so as to guide the third protrusion, the third guiding groove being sloped in an up direction in at least first and second outermost end portions thereof.

7. The electronic device according to claim 6, wherein the changing mechanism further includes a fourth protrusion provided on the third surface, and a fourth guiding groove provided in the second side surface and engaged with the fourth protrusion so as to guide the fourth protrusion, the fourth guiding groove being sloped in the down direction in at least opposite outermost end portions thereof.

8. The electronic device according to claim 1, wherein the second protrusion provided on the second surface does not contact one of the end portions of the second guiding groove provided in the side surface when the movable unit is stowed so as to leave a clearance between the second protrusion and one of the end portions of the second guiding groove.

9. The electronic device according to claim 1, wherein the first guiding groove is sloped in an up direction in at least the first and second outermost end portions thereof such that the top surface and the first surface are separated from each other by a first distance in the stowed state, the top surface and the first surface are separated from each other by a second distance during the sliding operation, and the top surface and the first surface are separated from each other by the first distance in the deployed state.

10. The electronic device according to claim 1, wherein the first protrusion is separated from one of the outermost end portions of the first guiding groove by a clearance distance when the top surface contacts the first surface in the stowed state.

* * * * *